US009829060B2

(12) United States Patent
Batsch et al.

(10) Patent No.: US 9,829,060 B2
(45) Date of Patent: Nov. 28, 2017

(54) ARMORED AIR SPRING ASSEMBLY

(71) Applicant: Hendrickson USA, L.L.C., Itasca, IL (US)

(72) Inventors: Christopher J. Batsch, Naperville, IL (US); Jason N. Gies, Crest Hill, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 11 days.

(21) Appl. No.: 14/991,353

(22) Filed: Jan. 8, 2016

(65) Prior Publication Data

US 2017/0198779 A1    Jul. 13, 2017

(51) Int. Cl.
*F16F 9/38* (2006.01)
*B60G 15/12* (2006.01)
(Continued)

(52) U.S. Cl.
CPC ............... *F16F 9/38* (2013.01); *B60G 11/27* (2013.01); *B60G 15/12* (2013.01); *B60G 15/14* (2013.01);
(Continued)

(58) Field of Classification Search
CPC .......... F16F 9/38; F16F 9/0209; F16F 9/0218; F16F 9/063; F16F 2230/023; B60G 11/27; B60G 15/12
See application file for complete search history.

(56) References Cited

U.S. PATENT DOCUMENTS 4,749,071 A * 6/1988 Taylor .................. B29C 53/602
138/31
4,801,019 A * 1/1989 Smolen, Jr. ............ B60G 11/00
267/149

(Continued)

FOREIGN PATENT DOCUMENTS

BE         548654      12/1956
DE        1287453      1/1969
(Continued)

OTHER PUBLICATIONS

International Searching Authority, International Search Report and Written Opinion dated Apr. 11, 2017, issued in connection with International Application No. PCT/US2017/012267, filed on Jan. 5, 2017, 21 pages.

*Primary Examiner* — Melanie Torres Williams
(74) *Attorney, Agent, or Firm* — McDonnell Boehnen Hulbert & Berghoff LLP (57) ABSTRACT

An air spring assembly including a damper that extends into an air cylinder float, the damper including a rod positioned having an end affixed to an end cap of the air cylinder float, a first piston affixed to the rod within the damper, a second piston affixed to the damper and having one or more seals on an outer surface thereof that sealingly engage an inner surface of the air cylinder float, wherein when a load applied to the air spring assembly is increased, the second piston and the second end of the damper move towards the end cap compressing air within the air cylinder float, wherein the air cylinder float is a solid member that does not expand as the air pressure within increases during compression, and wherein a protective membrane is positioned on an outer diameter of the air cylinder float.

24 Claims, 5 Drawing Sheets

(51) Int. Cl.
*F16F 13/00* (2006.01)
*B60G 11/27* (2006.01)
*B60G 15/14* (2006.01)
*F16F 9/06* (2006.01)
*F41H 7/02* (2006.01)
*F41H 7/04* (2006.01)

(52) U.S. Cl.
CPC .............. *F16F 9/06* (2013.01); *F16F 13/002* (2013.01); *F41H 7/02* (2013.01); *F41H 7/04* (2013.01); *F41H 7/042* (2013.01); *B60G 2202/152* (2013.01); *B60G 2202/314* (2013.01); *B60G 2204/40* (2013.01)

(56) References Cited

U.S. PATENT DOCUMENTS

| 8,827,292 B2 | 9/2014 | Batsch et al. | |
|---|---|---|---|
| 2007/0181392 A1* | 8/2007 | Pawloski | F16F 9/38 188/322.12 |
| 2008/0265475 A1 | 10/2008 | Keeney et al. | |

FOREIGN PATENT DOCUMENTS

| DE | 19721816 A1 * | 12/1997 | .......... F15B 15/1428 |
|---|---|---|---|
| EP | 0262080 | 1/1990 | |
| EP | 1843060 | 10/2007 | |
| FR | 1276396 A * | 11/1961 | ........... B60G 15/065 |
| GB | 833027 A * | 4/1960 | ................ F16F 9/38 |
| WO | 2014025388 | 2/2014 | |

* cited by examiner

ARMORED AIR SPRING ASSEMBLY

BACKGROUND

The present invention generally relates to vehicle suspensions. More particularly, the present invention relates to vehicle air suspension systems that include an armored pneumatic spring, or air spring useful for protecting the air spring from small arms fire, shrapnel from explosions and other debris. The pneumatic suspension may include an air strut assembly comprising an air cylinder and damper, which may be referred to as air spring assembly or strut assembly. Prior strut assemblies have included a flexible air spring made of rubber wherein the air spring includes a flexible rubber membrane that expands as the strut is loaded. Typical air springs of this type with a flexible rubber membrane provide a relatively low spring rate. As a result, additional spring rate and roll stiffness has typically been required to be added to the vehicle, e.g., often in the form of an additional, independent mechanical coil spring to meet vehicle handling and stability objectives. Therefore, when using air springs with flexible or expandable membranes, an 'anti-roll bar' or 'sway bar' has often been utilized as the mechanism to achieve the desired auxiliary roll stiffness.

In typical air springs with a flexible membrane, the operating pressures that may be utilized are limited because of the current limitations on flexible membrane and rubber construction. Thus, the typical operating pressure at normalized ride height is limited to 80-100 psi, up to 120 psi, with maximum pressure at full compression at around 200 psi. It is known that by increasing the effective spring rate of the strut assembly, the vehicle may achieve a higher ride frequency, and increased roll performance and lateral stability performance. In particular, when the effective spring rate of the strut at the designed ride height is increased, the need for auxiliary anti-roll devices may be eliminated.

In some applications using an air spring with a flexible membrane, a coil spring may be added to increase the effective spring rate of the strut. However, to achieve a desired effective spring rate at the designed ride height, the strut may require a larger spring, a larger volume of air (and thus a flexible membrane with a larger diameter) or a combination of both. In many applications, however, the space constraints, or limited footprint available for a strut, do not allow for an air spring with a flexible membrane even when combined with a coil spring to achieve the desired increased effective spring rate at the designed ride height of a vehicle because of the increased size of the strut required to achieve the desired effective spring rate.

Therefore, in some applications it would be desirable to provide a strut capable of operating at increased operating pressures, to achieve a desired increased effective spring rate at the designed ride height that fits within existing space constraints. In addition, it would be desirable to provide a strut having an increased effective spring rate. For example, in some applications it may be desirable to provide a strut having an effective spring rate high enough so that the need for auxiliary roll resisting devices such as an anti-roll bar is not required to achieve the desired vehicle roll resistance and lateral stability. Furthermore, it would be desirable to provide an air strut that does not expand when subjected to a load.

In addition, vehicle suspensions are also used with military vehicles. Military vehicles are often used in dangerous environments and may be subjected to small arms fire, shrapnel from exploding devices, and other debris encountered in harsh environments. Pneumatic air springs having a flexible rubber membrane are vulnerable to suffering damage from small arms fire, shrapnel from explosions and miscellaneous debris encounter in harsh operating conditions. Furthermore, because the flexible rubber membrane expands when a load is applied, it is difficult to provide a protective layer of armor around the periphery of the flexible rubber membrane, although desirable. Thus, a pneumatic air spring that has a non-expandable outer shell is a better candidate for providing a protective layer of armor thereon.

SUMMARY

The present embodiments are directed to an air spring that may be used on a suspension of a military vehicle. The air spring may include an armored air cylinder float having a protective membrane positioned on an outer diameter of the air cylinder float. The protective membrane may be made of para-aramid synthetic fibers to provide protection to the air spring from small arms fire, shrapnel from exploding devices, and other debris. The protective membrane is designed and sized to dissipate energy and maintain operation of the air spring. The air cylinder float may be constructed of a material that does not expand as a load is applied allowing for a higher pressure air spring and the benefits associated therewith. Alternately, the protective membrane may be positioned over an air spring having an expandable rubber bladder.

In one aspect, an air spring assembly is providing including a damper having a first end and a second end, wherein the first end includes a first mount and the second end of the damper extends into an air cylinder float, the damper includes a housing defining a cavity, the damper having a rod positioned in the air cylinder float, the rod having a first end positioned within the cavity of the damper and a second end affixed to an end cap that is connected to a first end of the air cylinder float, a first piston affixed to the first end of the rod within the cavity of the damper, a second piston affixed to the damper, the second piston having one or more seals on an outer surface thereof that sealingly engage an inner surface of the air cylinder float, wherein when a load applied to the air spring assembly is increased, the second piston and the second end of the damper move towards the end cap compressing air within the air cylinder float, wherein as the load is increased the volume of air within the air cylinder float decreases resulting in an increased air pressure, wherein the air cylinder float is a solid member that does not expand as the air pressure within increases during compression, and wherein a protective membrane is positioned on an outer diameter of the air cylinder float.

In another aspect, an air spring assembly is provided including an spring having an expandable rubber bladder, wherein when a load applied to the air spring is increased, the expandable rubber bladder expands, wherein a flexible protective membrane is positioned on an outer diameter of the expandable rubber bladder, and wherein when the expandable rubber bladder expands, the flexible protective member also expands.

In a further aspect, an air spring assembly is provided including an air cylinder float having an end cap, a rod positioned within the air cylinder float and secured to the end cap; a piston attached to the rod, wherein when a load applied to the air spring assembly is increased, the piston moves towards the end cap compressing air within the air cylinder float, wherein as the load is increased the volume of air within the air cylinder float decreases resulting in an increased air pressure, wherein the air cylinder float is a solid member that does not expand as the air pressure within increases during compression, and wherein a protective membrane is positioned on an outer diameter of the air cylinder float.

BRIEF DESCRIPTION OF THE DRAWINGS

Exemplary embodiments of the invention are described herein with reference to the drawings, wherein like parts are designated by like reference numerals, and wherein:

FIG. 3 is a left side view of vehicle suspension 100 shown in FIG. 2 showing air spring assembly 50a with protective membrane 52a;

DETAILED DESCRIPTION OF THE INVENTION

Figure 1:
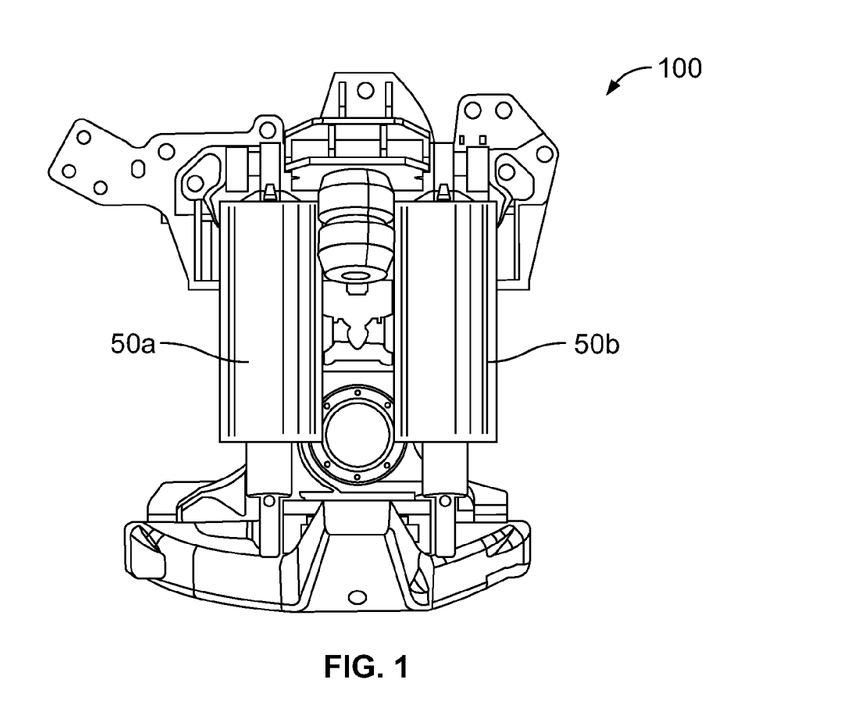
FIG. 1 is a front view of air spring assemblies 50a and 50b installed on vehicle suspension 100.

FIG. 1 is a front view of air spring assemblies 50a and 50b installed on vehicle suspension 100. Vehicle suspension 100 is an example vehicle suspension and air spring assemblies 50a and 50b may be used in connection with vehicle suspensions having different configurations and geometry. Furthermore, air spring assemblies 50a and 50b are example air spring assemblies may have different configurations or geometries than shown.

Figure 2:
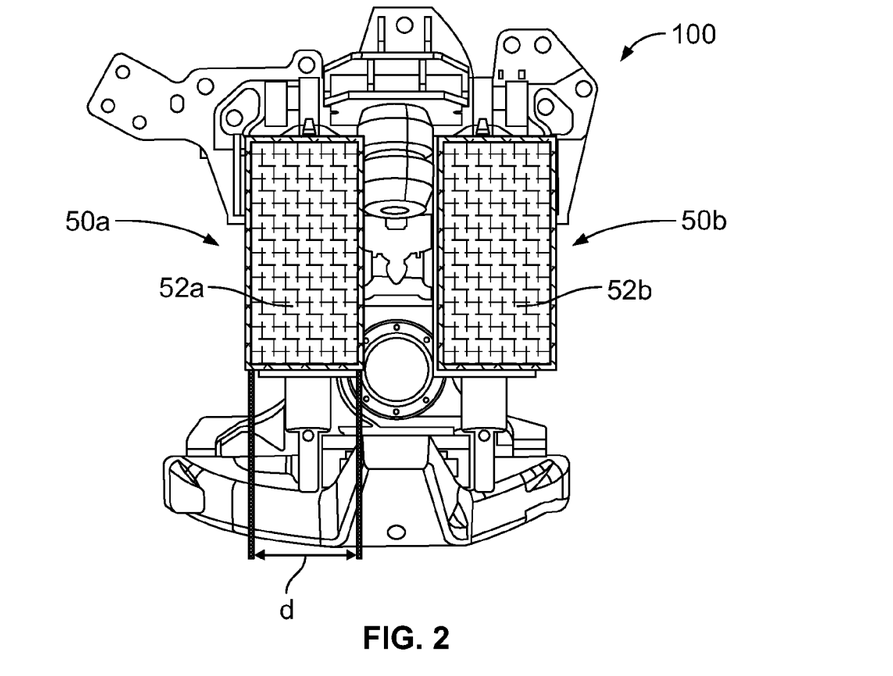
FIG. 2 is a front view of air spring assemblies 50a and 50b shown installed on vehicle suspension 100 shown in FIG. 1 with protective membranes 52a and 52b positioned over air spring assemblies 50a and 50b.

As noted above, vehicle suspensions, including vehicle suspension 100, may be installed on military vehicles. Military vehicles often operate in harsh and dangerous environments where they may be subjected to small arms fire, shrapnel from explosive devices, and other debris. As a result, the air springs on the vehicle suspension may be vulnerable to damage in such an environment. As a result, the present embodiments advantageously provide an armored coating or protective membrane to protect the air springs from damages. FIG. 2 is a front view of air spring assemblies 50a and 50b shown installed on vehicle suspension 100 shown in FIG. 1 with protective membranes 52a and 52b positioned over air spring assemblies 50a and 50b.

The protective membranes 52a and 52b may be constructed of para-aramid synthetic fibers, or other high strength material such as ballistic nylon. In some embodiments, poly-para-phenylene terephthalamide fibers may be used, such as those sold under the trademark KEVLAR®.

Further, the protective membranes 52a and 52b may be formed of a plurality of layers of such para-aramid synthetic fibers or ballistic nylon.

Figure 3:
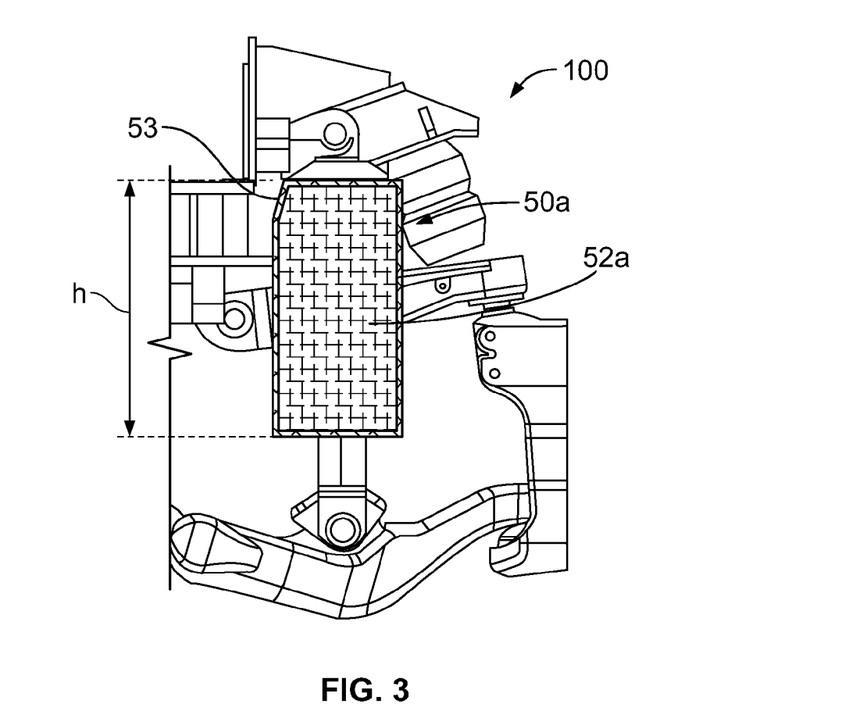

FIG. 3 is a left side view of vehicle suspension 100 shown in FIG. 2 showing air spring assembly 50a with protective membrane 52a. Protective membrane 52a is positioned over the outer diameter of air spring assembly 50a and in this embodiment extends a distance h, such that the entire height of the air spring assembly 50a is covered by the protective membrane 52a, however in other applications it may extend a greater or lesser distance. Furthermore, protective membrane 52a advantageously includes an upper portion 53 of an upper surface of the protective membrane 52a adapted to face an inner portion of a military vehicle is sloped to provide for a greater clearance between the protective membrane and vehicle suspension 100.

Figure 4:
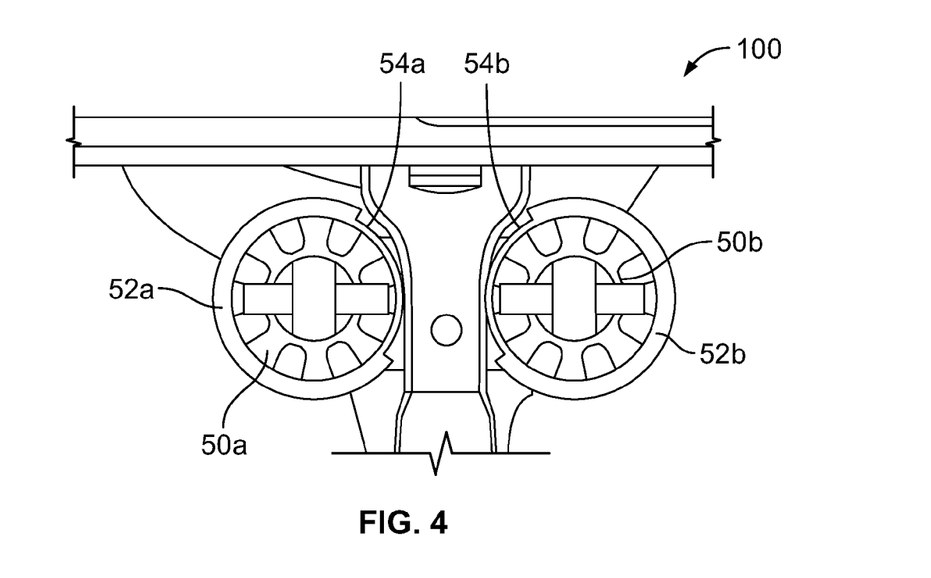
FIG. 4 is a top view of vehicle suspension 100 shown in FIGS. 2 and 3 showing air spring assembly 50a with protective membrane 52a and air spring assembly 50b with protective membrane 52b.

FIG. 4 is a top view of vehicle suspension 100 shown in FIGS. 2 and 3 showing air spring assembly 50a with protective membrane 52a and air spring assembly 50b with protective membrane 52b. In this embodiment, protective membrane 52a extends 360 degrees around the outer diameter of air spring assembly 50a and protective membrane 52b extends 360 degrees around the outer diameter of air spring assembly 52a. In other embodiments, the protective membrane may not extend 360 degrees around the outer surface of the air spring assembly. For example, inner portions of the air spring assembly may not be covered with a protective membrane as they are less likely to be hit with small arms fire, shrapnel from explosions, or other debris than the more exposed outer portions of the air spring assembly.

Furthermore, protective membranes 52a and 52b may have a thickness of 0.5 to 0.75 inches, although in some applications a greater or lesser thickness may be used. In addition, in this embodiment of FIG. 4, protective membranes 52a and 52b include reduced thickness inner portions 54a and 54b respectively that may be on the order of $\frac{1}{8}^{th}$ to ¼ of an inch thick. In other embodiments the area of reduced thickness of inner portions 54a and 54b may have no protective coating as this area is less prone to being hit with small arms fire, shrapnel from explosions or other debris. The reduced thickness inner portions 54a and 54b also provide for greater clearance between the air spring assemblies 50a and 50b and components of vehicle suspension 100. The protective membranes 52a and 52b are sized and designed to protect air spring assemblies 50a and 50b by dissipating energy of a projectile to prevent damages to air spring assemblies 50a and 50b and allowing them to continue to operate properly.

Figures 5, 6:
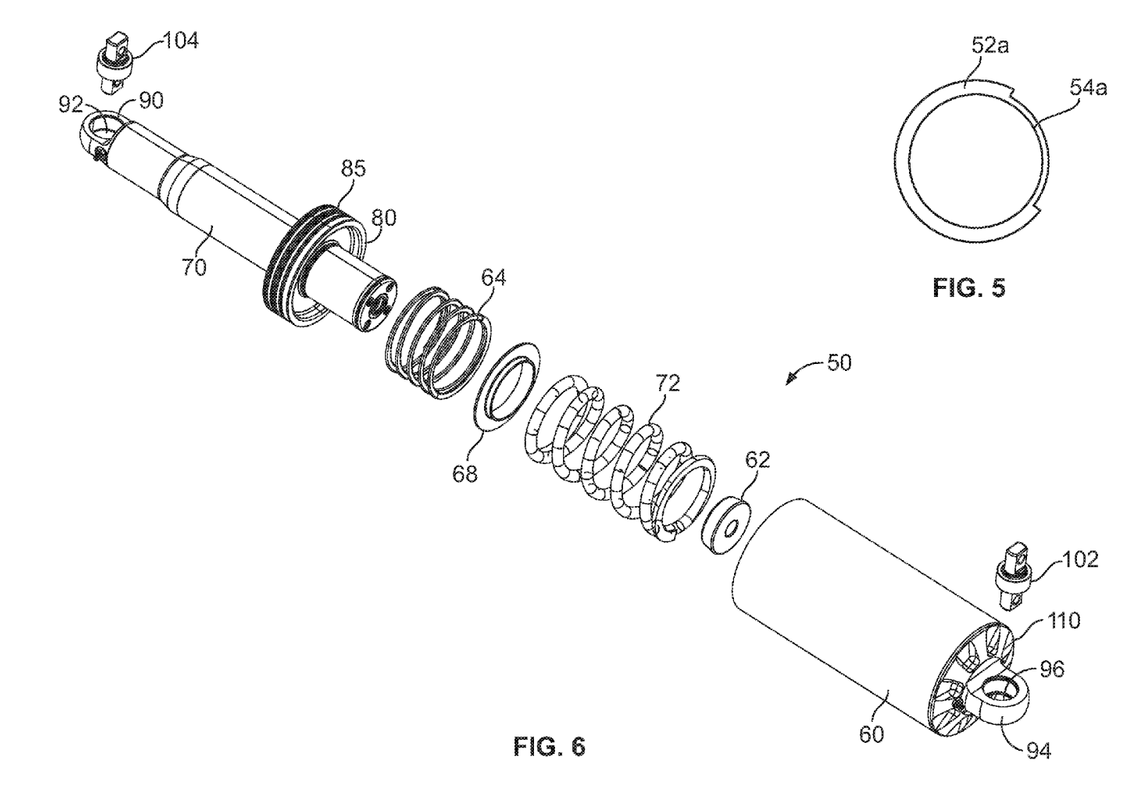
FIG. 5 is a top view of protective membrane 52a shown in FIGS. 2-4.
FIG. 6 is an exploded view of an example air spring assembly 50 shown without a protective membrane or internal rod that may be used for air spring assemblies 50a and 50b shown in FIGS. 1-4.

FIG. 5 is a top view of protective membrane 52a shown in FIGS. 2-4 removed from air spring assembly 50a. Reduced thickness section 54a is clearly shown. In this embodiment, there is an abrupt transition to the reduced thickness section 54a although the transition could be gradual as well.

FIG. 6 is an exploded view of an example air spring assembly 50 shown without a protective membrane or internal rod that may be used for air spring assemblies 50a and 50b shown in FIGS. 1-4. Other air springs configurations and geometries different from that shown in FIG. 6 may also be used for air spring assembly 50. In FIG. 6, air spring assembly 50 includes an air cylinder float 60 that is a tubular member, and an end cap 110 having a first mount 94 with a through-hole 96 that may be used to mount the upper end of air spring assembly 50 to a vehicle using bar pin 102. The end cap 110 may be threaded such that an end of the air cylinder float 60 may be threaded thereto. In a preferred embodiment an O-ring is positioned adjacent the threads to form a seal. Alternately, the end cap 110 could be welded to the air cylinder float 60. In FIG. 6, the other end of air spring assembly 50 includes a damper 70, although in other embodiments the air spring assembly 50 may not include a damper. In FIG. 6, the end of damper 70 includes a second mount 90 with a through-hole 92 that may be used to mount the lower end of air spring assembly 50 to a vehicle using bar pin 104. Attached to damper 70 is spring support 80 positioned on a piston. Positioned within air cylinder float 60 is primary coil spring 72 and tender or supplemental spring 64 with spring adaptor 68 positioned between primary coil spring 72 and tender or supplemental spring 64. Also included is a bump stop 62 positioned adjacent the end cap 110 which serves as stop when the end of damper 70 fully compresses springs 72 and 64.

In FIG. 6, the tender or supplemental spring 64 is shown positioned to abut spring support 80 and primary coil spring 72 is shown positioned to abut end cap 110 within air cylinder float 60. However, the positioning of primary coil spring 72 and tender or supplemental spring 64 may be reversed such that the tender or supplemental spring 64 abuts end cap 110 and the primary coil spring 72 abuts spring support 80 within air cylinder float 60. The tender or supplemental spring 64 is used to keep the primary coil spring 72 properly positioned upon rebound and to keep the primary coil spring 72 from being loose when the air spring assembly 50 is fully extended, although in some applications the tender or supplemental spring 64 may not be needed. Furthermore, in some applications the primary coil spring 72 may not be required and thus air spring assembly 50 may include no springs.

Figure 7:
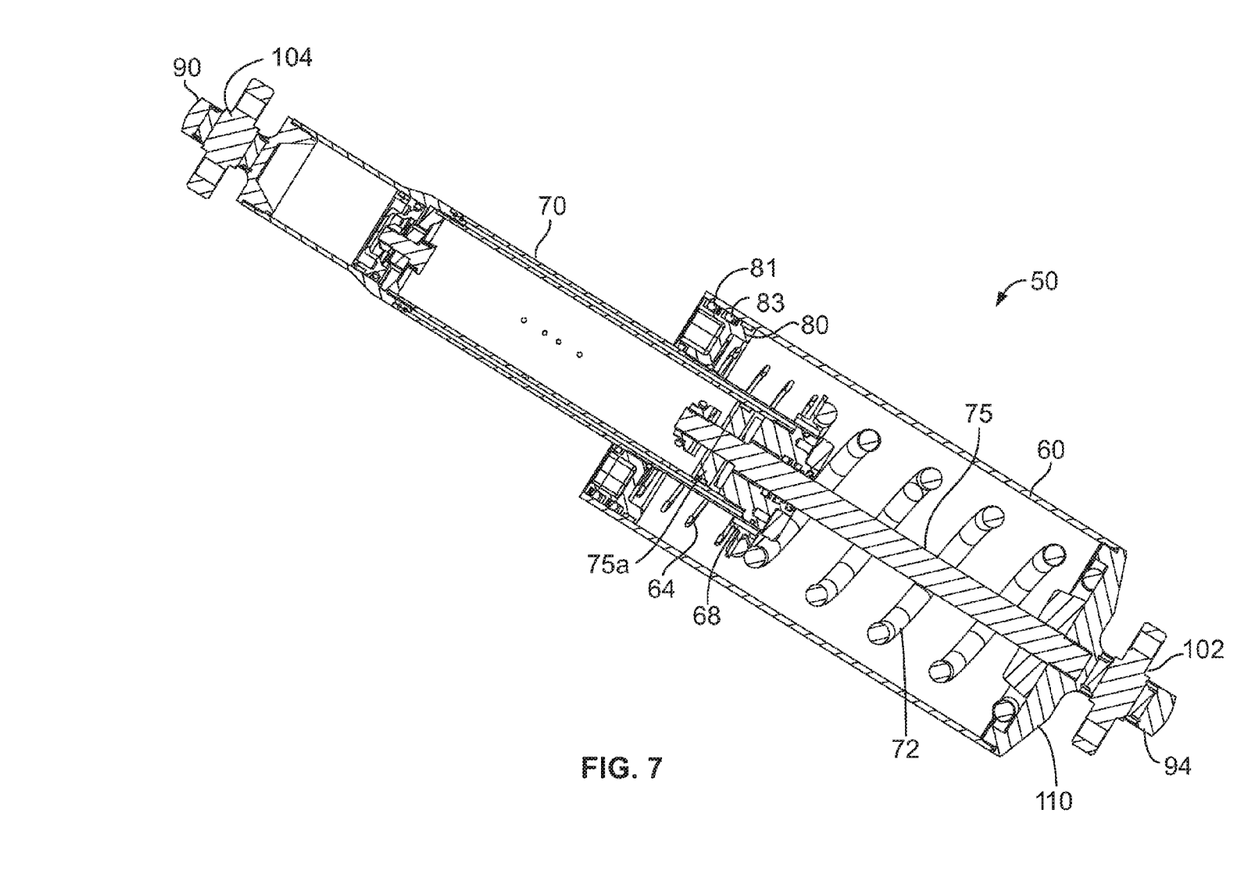
FIG. 7 is a cross-sectional view of air spring assembly 50 shown in FIGS. 1-4 in a fully extended state.

The air spring assembly 50 is advantageously designed to operate at higher service air pressures than a typical air spring cylinder having a flexible membrane, although it may also operate at lower service air pressures as well. When a load is applied to the air spring assembly 50, the spring support 80 attached to damper 70 moves longitudinally within air cylinder float 60 compressing the primary coil spring 72 and tender spring 64 and reducing the volume within the air cylinder float 60, and thereby increasing the pressure of the air inside the air cylinder float. As shown in FIG. 7, seals 81 and 83 are positioned on the outside surface of spring support 80 and are used to seal the air within the air cylinder float 60 as the air pressure increases. Similarly, the end cap 110 and air cylinder float 60 are sealed to prevent air from leaking and to maintain the air pressure within the air cylinder float 60. The air cylinder float 60 does not expand as the air pressure within increases. The air cylinder float 60 is made of a non-flexible material, preferably a metal which is able to withstand significantly increased air pressures within when compared to an air spring having a flexible membrane. In a preferred embodiment, the air cylinder float 60 is made of mild steel DOM tubing. In FIG. 7, a first piston 75a is attached to a first end of rod 75 within damper 70 and a second end of rod 75 is attached to end cap 110.

As noted above, in typical air springs with a flexible membrane, the operating pressures that may be utilized are limited due to the current limitations on flexible membrane and rubber construction. As a result, the typical normalized ride height operating pressure is limited to 80-100 psi, up to 120 psi, with maximum pressure at full compression at around 200 psi. However, with air spring assembly 50 having solid, non-expandable air cylinder float 60, significantly higher operating pressures may be used. For example, air spring assembly 50 can be arranged in a configuration to operate at ride height at 175-250 psi air pressure, with a peak air pressure of 1000 psi air pressure or higher. Other example configurations of air spring assembly 50 with different ride heights, operating air pressures at ride height, and peak air pressures are also possible, including air pressures well in excess of 1000 psi.

The effective spring rate of an air cylinder that also includes a coil spring is a function of the spring rate of the coil spring and the pressure of the air within the air cylinder float 60. As used herein, the effective spring rate refers to the combined spring rate of the coil spring (if used) and air pressure within the air cylinder float 60. By increasing the effective spring rate of the strut, through, e.g., higher air pressures in the air cylinder float 60 and/or the addition of fluid in the air cylinder float to reduce the volume of the air in the air cylinder float, the vehicle may achieve a higher ride frequency, and increased roll performance and lateral stability performance. Therefore, air spring assembly 50 is able to provide an increased effective spring rate because of its ability to operate at higher service air pressures. In particular, the effective spring rate of the strut at the designed ride height is high enough that the need for auxiliary anti-roll devices may be eliminated.

In a preferred embodiment of the air spring assembly 50 shown, the effective spring rate at the designed ride height may be 1500 to 2000 pounds/inch. The designed ride height is typically defined as the distance between the wheel center and the underside of the chassis frame. It could also be the distance between a point on the suspension system (unsprung mass) and a point on the body (sprung mass) such as the distance between mounting points on a suspension spring or strut. On typical air suspension systems it is desirable that this ride height should remain constant regardless of body mass or payload therefore the vehicle height and 'design ride height' would remain constant whether the vehicle was loaded to curb weight or at its' maximum Gross Vehicle Weight (GVW) loading. Maintaining this ride height can provide benefits such as maintaining vehicle height, ground clearance, roll center height position, driveline angles and providing consistent stability and handling properties.

Maintaining the system design ride height is typically managed by a 'height control sensor' that will react to changes in ride height by either introducing more air into the air springs/struts or allowing air to be exhausted from the air springs/struts. These air management systems can be tuned in terms of responsiveness to react to in-service dynamic changes to ride height position when traversing uneven terrain. These systems may also be programmed (or manually adjusted) to provide 'self-leveling' features such that the ride height at left wheels vs. right wheels or front wheels vs. rear wheels can be adjusted to reduce or maintain body angles on grades or side slopes. The designed ride height correlates to the amount the air spring assembly 50 is compressed at expected operating vehicle weights. Therefore, as used herein, the term "designed ride height" refers to the distance the air spring assembly is compressed. Therefore, a designed ride height of 4 inches refers to the air spring assembly 50 being compressed 4 inches at expected operating vehicle weights.

With the air spring assembly 50 having such a high effective spring rate at the designed ride height, the need for auxiliary roll resisting devices such as an anti-roll bar may not be required to achieve the desired vehicle roll resistance and lateral stability. In addition, in order for an air spring with a flexible membrane to achieve such a high effective spring rate, the air spring would be required to have a significantly increased diameter to achieve the effective spring rate at the designed ride height. For example, in a preferred embodiment of the air spring assembly 50 having a 9 inch distance of compression, the diameter of the air cylinder float is 7.375 inches with a wall thickness of 3/16ths of an inch. In a conventional air spring with a flexible membrane, with typical operating vehicle air pressures of 80-110 psi, with the same 9 inch distance of compression, the diameter would need to be 10.1 inches in the fully extended state, and 11.5 inches in the fully compressed state. However, to achieve the same effective spring rate at the designed ride height as air spring assembly 50, the air spring with flexible membrane would need to be even larger, with a larger volume or air and/or larger coil spring. In many applications there simply is not enough space to accommodate an air spring having a flexible membrane, even when an included primary coil spring is used, because it is required to have such a larger diameter on the order of at least 33 to 50 percent larger than air spring assembly 50. As a result, there are many applications where the use of air spring assembly 50, with a solid, non-expandable air cylinder float 60, is advantageous, particularly on vehicles where there is limited space to position the air spring assembly.

In the preferred embodiment of cylinder shock assembly 50 shown in FIGS. 6 and 7, as noted above, the spring support 80 which is positioned on a piston may travel 0-9 inches longitudinally within the air cylinder float 60. The bump stop 62 is preferably comprised of UHMWPE, also known as ultra-high molecular weight polyethylene. Similarly, spring adaptor 68 is also preferably comprised of UHMWPE. Spring support 80 is preferably comprised of 6061-T6 aluminum alloy, as are end cap 110 and upper mount 94 and lower mount 90. The damper 70 is comprised of various steel components as is conventional in the art. Preferably, damper 70 is filled with a fluid, such as a hydraulic fluid, although the cavity the damper may be filled with an air such that damper 70 is an air damper.

Figure 8:
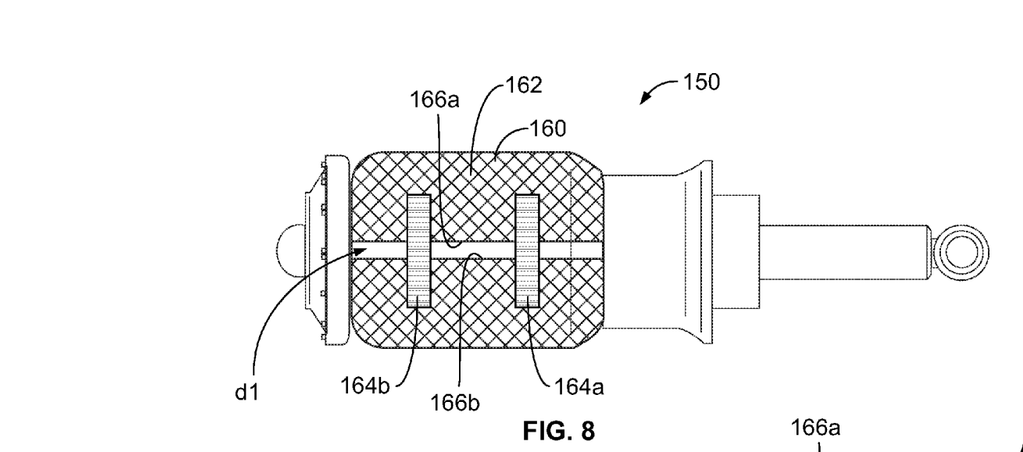
FIG. 8 is a front view of air spring 150 having protective membrane 162 positioned over expandable rubber bladder 160.

FIG. 8 is a front view of air spring 150 having protective membrane 162 positioned over expandable rubber bladder 160. Air spring 150 may be used for air spring assemblies 50a and 50b shown in FIGS. 1-4. In the embodiment of FIG. 8, the protective membrane 162 is designed to allow for expansion of the expandable rubber bladder 160. Thus, protective membrane 162 may comprise a flexible layer of para-aramid synthetic fibers or other high strength material such as ballistic nylon. In some embodiments, poly-paraphenylene terephthalamide fibers may be used, such as those sold under the trademark KEVLAR®. Further, the protective membrane 162 may be formed of a plurality of layers of such para-aramid synthetic fibers or ballistic nylon.

In the embodiment of FIG. 8, the protective membrane 162 includes longitudinally extending edges 166a and 166b shown with a gap d1 therebetween. In other embodiments, the longitudinally extending edges 166a and 166b may be overlapping. Retention straps 164a and 164b are shown extending over longitudinally extending edges 166a and 166b and gap d1 to retain the protective membrane in position. Retention straps 164a and 164b may be flexible and/or elastic to allow for expansion of expandable rubber bladder 160.

Figure 9:
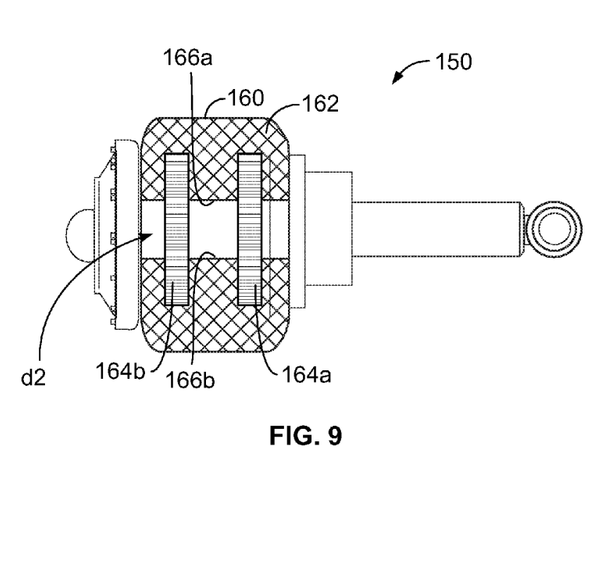
FIG. 9 is a front view of air spring 150 shown in FIG. 8 having protective membrane 162 over expandable rubber bladder 160 after the expandable rubber bladder 160 has been expanded.

FIG. 9 is a front view of air spring 150 shown in FIG. 8 having protective membrane 162 over expandable rubber bladder 160 after the expandable rubber bladder 160 has been expanded when a load has been applied. As shown in FIG. 9, after expansion of expandable rubber bladder 160, longitudinally extending edges 166a and 166b have been separated from each other as shown with a gap d2 therebetween. In other embodiments, the longitudinally extending edges 166a and 166b may continue to be overlapping after the expansion of expandable rubber bladder 160. Retention straps 164a and 164b are shown extending over longitudinally extending edges 166a and 166b and gap d2 to retain the protective membrane in position even after expandable rubber bladder has been expanded. Retention straps 164a and 164b may be flexible and/or elastic to allow for expansion of expandable rubber bladder 160.

As with the protective membranes 52a and 52b shown in FIGS. 2-4, protective membrane 162 shown in FIGS. 8 and 9 is sized and designed to protect air spring assembly 150 by dissipating energy of a projectile to prevent damages to air spring assembly 150 and allowing it to continue to operate properly. The thickness of the protective member 162 may be 0.5 to 0.75 inches thick, although greater or lesser thicknesses may also be used.

Example embodiments of the present embodiments have been described above. Those skilled in the art will understand that changes and modifications may be made to the described embodiments without departing from the true scope and spirit of the present invention, which is defined by the claims.

We claim:
1. An air spring assembly, comprising:
a damper having a first end and a second end, wherein the first end includes a first mount and the second end of the damper extends into an air cylinder float;
the damper includes a housing defining a cavity, the damper having a rod positioned in the air cylinder float, the rod having a first end positioned within the cavity of the damper and a second end affixed to an end cap that is connected to a first end of the air cylinder float;
a first piston affixed to the first end of the rod within the cavity of the damper,
a second piston affixed to the damper, the second piston having one or more seals on an outer surface thereof that sealingly engage an inner surface of the air cylinder float;
wherein when a load applied to the air spring assembly is increased, the second piston and the second end of the damper move towards the end cap compressing air within the air cylinder float;
wherein as the load is increased the volume of air within the air cylinder float decreases resulting in an increased air pressure;
wherein the air cylinder float is a solid member that does not expand as the air pressure within increases during compression;
wherein a protective membrane is positioned on an outer diameter of the air cylinder float; and
wherein a second portion of the protective member has a thickness less than a thickness of a first portion of the protective membrane.

2. The air spring assembly of claim 1, wherein at a designed vehicle ride height the air pressure within the air cylinder float is between 175 and 250 psi inclusive.

3. The air spring assembly of claim 1, further including a primary coil spring positioned within the air cylinder float.

4. The air spring assembly of claim 3, further including a tender spring positioned within the air cylinder float in series with the primary coil spring.

5. The air spring assembly of claim 1, wherein the protective member extends 360 degrees around the outer diameter of the air cylinder float.

6. The air spring assembly of claim 1, wherein the first portion of the protective membrane has a thickness of between 0.5 inches to 0.75 inches inclusive.

7. The air spring assembly of claim 1, wherein the thickness of the second portion of the protective portion is $\frac{1}{8}^{th}$ of an inch.

8. The air spring assembly of claim 5, wherein the protective membrane covers the entire outer diameter of the air cylinder float.

9. The air spring assembly of claim 1, wherein the protective membrane comprises a plurality of layers of para-aramid fibers.

10. The air spring assembly of claim 9, wherein the para-aramid synthetic fibers comprise poly-para-phenylene terephthalamide.

11. The air spring of claim 1, wherein the outer diameter of the air cylinder float is 6 inches.

12. The air spring assembly of claim 1, wherein the outer diameter of the air cylinder float is equal to an inner diameter of the protective membrane.

13. The air spring assembly of claim 1, wherein the protective membrane has a height of between 19 and 21 inches inclusive.

14. An air spring assembly, comprising:
a damper having a first end and a second end, wherein the first end includes a first mount and the second end of the damper extends into an air cylinder float;
the damper includes a housing defining a cavity, the damper having a rod positioned in the air cylinder float, the rod having a first end positioned within the cavity of the damper and a second end affixed to an end cap that is connected to a first end of the air cylinder float;
a first piston affixed to the first end of the rod within the cavity of the damper,
a second piston affixed to the damper, the second piston having one or more seals on an outer surface thereof that sealingly engage an inner surface of the air cylinder float;
wherein when a load applied to the air spring assembly is increased, the second piston and the second end of the damper move towards the end cap compressing air within the air cylinder float;
wherein as the load is increased the volume of air within the air cylinder float decreases resulting in an increased air pressure;
wherein the air cylinder float is a solid member that does not expand as the air pressure within increases during compression; and
wherein a protective membrane is positioned on an outer diameter of the air cylinder float; and
wherein an upper portion of an upper surface of the protective membrane adapted to face an inner portion of a military vehicle is sloped to provide for a greater clearance between the protective membrane and a suspension of the military vehicle.

15. An air spring assembly, comprising:
a spring having an expandable rubber bladder wherein when a load applied to the air spring is increased, the expandable rubber bladder expands;
wherein a flexible protective membrane is positioned on an outer diameter of the expandable rubber bladder;
wherein when the expandable rubber bladder expands, the flexible protective member also expands;
wherein the flexible protective member has first and second edges that extend longitudinally along the air cylinder float; and
a distance between the first and second edges changes when expandable rubber bladder expands.

16. The air spring assembly of claim 15, wherein flexible straps are used to connect the first and second edges.

17. The air spring assembly of claim 15, wherein the first and second edges overlap prior to expansion of the expandable rubber bladder.

18. The air spring assembly of claim 15, wherein the protective membrane comprises a plurality of layers of para-aramid fibers.

19. The air spring assembly of claim 18, wherein the para-aramid synthetic fibers comprise poly-para-phenylene terephthalamide.

20. An air spring assembly, comprising:
an air cylinder float having an end cap;
a rod positioned within the air cylinder float and secured to the end cap;
a piston attached to the rod;
wherein when a load applied to the air spring assembly is increased, the piston moves towards the end cap compressing air within the air cylinder float;
wherein as the load is increased the volume of air within the air cylinder float decreases resulting in an increased air pressure;
wherein the air cylinder float is a solid member that does not expand as the air pressure within increases during compression;
wherein a protective membrane is positioned on an outer diameter of the air cylinder float; and
wherein a second portion of the protective member has a thickness less than a thickness of a first portion of the protective membrane.

21. The air spring assembly of claim 20, wherein at a designed vehicle ride height the air pressure within the air cylinder float is between 175 and 250 psi inclusive.

22. The air spring assembly of claim 20, wherein the first portion of the protective membrane has a thickness of between 0.5 inches to 0.75 inches inclusive.

23. The air spring assembly of claim 20, wherein the protective membrane comprises a plurality of layers of para-aramid fibers.

24. The air spring assembly of claim 20, wherein the para-aramid synthetic fibers comprise poly-para-phenylene terephthalamide.

* * * * *